United States Patent [19]

Martinson et al.

[11] Patent Number: 5,349,851
[45] Date of Patent: Sep. 27, 1994

[54] ACTIVE THERMAL ISOLATION FOR TEMPERATURE RESPONSIVE SENSORS

[75] Inventors: Scott D. Martinson, Hampton; David L. Gray, Newport News; Debra L. Carraway, Virginia Beach, all of Va.; Daniel C. Reda, San Jose, Calif.

[73] Assignee: The United States of America as represented by the Administrator of the National Aeronautics and Space Administration, Washington, D.C.

[21] Appl. No.: 181,938

[22] Filed: Jan. 18, 1994

Related U.S. Application Data

[62] Division of Ser. No. 820,431, Jan. 2, 1992, Pat. No. 5,311,772.

[51] Int. Cl.$^5$ ............................. G01F 1/68; G01M 9/00
[52] U.S. Cl. ........................................ 73/147; 73/204.18
[58] Field of Search .............. 73/147, 204.18, 204.26, 73/204.16, 204.25, 204.15

[56] References Cited

U.S. PATENT DOCUMENTS 4,283,944  8/1981  Gruner et al. ............... 73/204.26
5,311,772  5/1994  Martinson et al. ............. 73/147

Primary Examiner—Donald Woodiel
Attorney, Agent, or Firm—Kimberly A. Chasteen

[57] ABSTRACT

A temperature responsive sensor is located in the airflow over the specified surface of a body and is maintained at a constant temperature. An active thermal isolator is located between this temperature responsive sensor and the specified surface of the body. The temperature of this isolator is controlled to reduce conductive heat flow from the temperature responsive sensor to the body. This temperature control includes (1) operating the isolator at the same temperature as the constant temperature of the sensor and (2) establishing a fixed boundary temperature which is either (a) less than or equal to or (b) slightly greater than the sensor constant temperature.

26 Claims, 3 Drawing Sheets

ACTIVE THERMAL ISOLATION FOR TEMPERATURE RESPONSIVE SENSORS

ORIGIN OF THE INVENTION

The invention described herein was made by employees of the United States Government and may be manufactured and used by or for the Government for governmental purposes without the payment of any royalties thereon or therefor.

This is a division of copending application(s) Ser. No. 07/820,431, filed on Jan. 2, 1992, U.S. Pat. No. 5,311,777.

BACKGROUND OF THE INVENTION

1. Technical Field of the Invention

The present invention relates generally to detecting flow transition and shear stress or skin friction of airfoils and more particularly to an apparatus and method for achieving active thermal isolation of such detection devices.

2. Discussion of the Related Art

The detection of flow transition between laminar and turbulent flow and of shear stress or skin friction of airfoils is important in basic research for validation of airfoil theory and design. These values are conventionally measured using hot film nickel sensors deposited on a substrate of polyimide such as "Kapton®" brand polyimide produced by the E. I. Dupont de Nemours Company, which in turn is bonded to the surface of the aerodynamic body exposed to an airflow, e.g., an airfoil or wind tunnel model. The polyimide substrate provides sufficient electrical insulation to avoid shorts between the body surface and the resistance circuitry of the sensor. However, the polyimide substrate does not have sufficient thermal insulation characteristics. Substantial heat is accordingly lost via conductive heat transfer from the sensor to the intimately located body. This heat loss is of course worsened by the use of highly heat conductive materials to construct the aerodynamic body. This thermal loss affects both the sensor frequency response and resolution.

The thickness of the polyimide substrate may be increased in an attempt to provide better thermal insulation, i.e., passive thermal insulation. However, this increased thickness causes flow disturbances which contaminate the test environment.

Another proposal to thermally isolate the sensor from the model uses internal heat sources to heat the entire aerodynamic body surface. However, the thermal mass of the body is significantly larger than the sensor and the conductive heat transfer accordingly cannot be accurately controlled since the response time necessary for the body temperature change is significantly slower than the response time necessary for the hot film sensors. In addition, this proposal requires significant energy expenditures to heat the entire surface area as well as extensive modification of the interior region of the aerodynamic body, and especially that of a model, in order to house the heating system. Also, heating the entire test body may alter the basic flow state of the body under study.

OBJECTS

It is accordingly an object of the present invention to provide thermal isolation of a hot film or other type of temperature responsive anemometer from an underlying body.

It is another object of the present invention to accomplish the foregoing object actively.

It is a further object of the foregoing object to provide thermal isolation of a hot film or other type of temperature responsive anemometer from an underlying body without creating any flow disturbances.

It is another object of the present invention to accomplish the foregoing objects with minimal energy requirements.

It is a further object of the present invention to accomplish the foregoing objects in a simple manner and without extensive modification of the body.

Additional objects and advantages of the present invention are apparent from the drawings and specification which follow.

SUMMARY OF THE INVENTION

The foregoing and additional objects are obtained by a method and apparatus according to the present invention. A temperature responsive sensor is located in the airflow over the specified surface of a body and is maintained at a constant temperature. An active thermal isolator is located between this temperature responsive sensor and the specified surface of the body. The temperature of this isolator is controlled to reduce conductive heat flow from the temperature responsive sensor to the body. This temperature control includes (1) operating the isolator at the same temperature as the constant temperature of the sensor and (2) establishing a fixed boundary temperature which is either (a) less than or equal to or (b) slightly greater than the sensor constant temperature.

DETAILED DESCRIPTION

Figure 1:
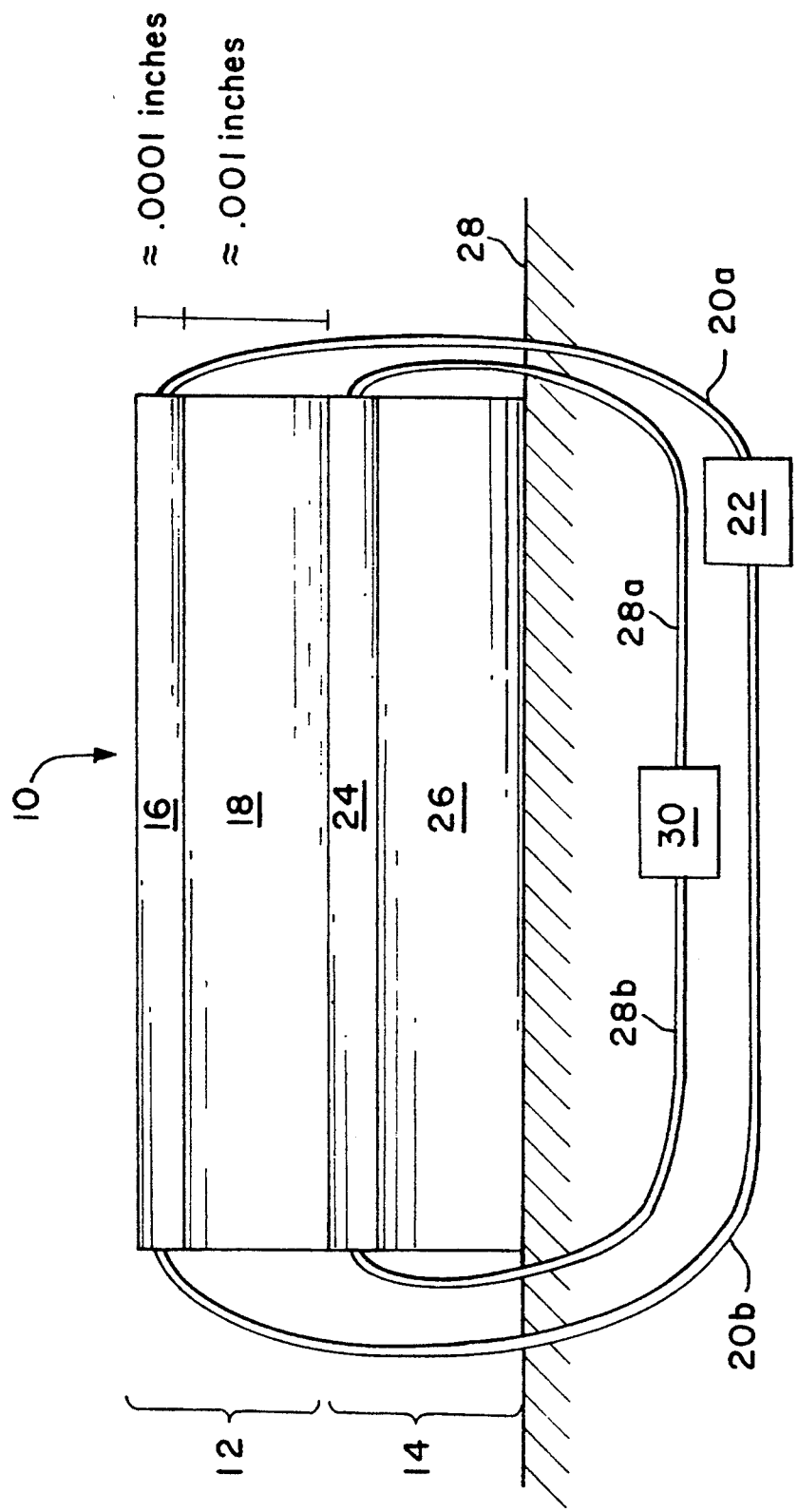
FIG. 1 is a side view of a first embodiment of the present invention comprising an upper hot film sensor and a lower active thermal isolator.

Referring to FIG. 1, an active thermal insulation hot film anemometer according to the present invention is designated generally by reference numeral 10. An upper sensor 12 serves as a flow detection hot film sensor in the conventional manner and a similarly constructed, lower sensor 14 serves as an active thermal isolation sensor. Specifically, upper hot film sensor 12 comprises an upper sensing metal layer 16 having a high temperature coefficient of resistance, e.g., nickel, platinum, etc., which is adhered to, via an appropriate glue, or suitably deposited onto a lower layer 18 having a high electrical resistance such as a polyimide film, e.g., "Kapton®" brand film commercially available for the E. I. Dupont de Nemours Company. Hot film sensor 12 operates in a known manner, namely an electrical resistance is developed across metal layer 16 via wires 20a and 20b connected to a remotely located resistance developing and measuring device 22 containing a constant temperature anemometer circuit which heats metal layer 16. As air flows over this layer, convective heat transfer occurs causing the layer to cool, i.e., the electrical resistance changes. Measuring device 22 measures the amount of voltage required to maintain a constant temperature above the fluid flow temperature. This voltage requirement is indicative of localized shear stress, skin friction and flow transition.

Lower thermal isolation sensor 14 likewise comprises an upper metal layer 24 having a high temperature coefficient of resistance, e.g., nickel, platinum, etc., which is adhered to, via an appropriate glue, or suitably deposited onto a lower layer 26 having a high electrical resistance such as polyimide film, e.g., Kapton ® film. Lower layer 26 of lower thermal isolation sensor 14 is bonded or adhered to an outer surface of aerodynamic body 28 whereas lower layer 18 of the upper hot film sensor 12 is bonded or adhered to metal layer of lower sensor 14 in a back-to-face orientation, wherein "back" refers to the electrical resistive layer of the upper sensor and "face" refers to the metal layer of the lower thermal isolator. The adhesion laminate (not shown) should be as thin as possible while maintaining an adequate bond, e.g., approximately 0.0005". The aerodynamic body is an airfoil, wind tunnel model, etc. which is exposed to an air flow. For convenience, the specific application of a wind tunnel model is used throughout. Metal layer 24 is connected via wires 28a and 28b to a controllable resistance developing circuit 30. Both lower layers 18 and 26 may extend past the metal layer in the upstream and downstream directions per conventional design.

Lower active thermal isolation sensor 14 can be used, in several modes. In one mode it is operated with the same response time, thereby having approximately the same temperature as, the upper flow detection sensor 12 to provide dynamic localized heating of the model 28. The respective temperatures of the two sensors would not be identical due to the temperature loss across the polyimide layer 18 and the adjoining glue layer. When the relative temperatures of a particular sensor is discussed, the relative temperature of the metal layer film is the quantity under discussion.

This localized heating can then be utilized to thermally isolate the upper detection sensor 12 from the thermal properties of the model. In a conventional single sensor configuration, the single hot film sensor provides all the power requirements to sustain both a conductive heat transfer to the model and a convective heat transfer to the air flow. In the present invention, lower sensor 14 operated in this first mode compensates for the model thermal properties by providing the model with the required amount of heat to sustain the conduction rate as in the conventional single sensor configuration to effectively thermally isolate the upper sensor, thereby allowing the upper sensor to respond solely to the air flow independently of any model thermal properties. In addition, the upper hot film sensor 12 requires less power than in a conventional single sensor configuration since the lower sensor 14 is performing the heating of the model.

When the two sensors are operated at the same temperature, the frequency response of the upper sensor 12 necessarily decreases. Specifically, data shows that the frequency response obtained with the standard square wave test is lower for a model or airfoil with thermally insulating properties, and higher for a model or airfoil with more thermally conductive properties. The two sensors operating at the same temperature have the same effect as if a single sensor were mounted on a model or airfoil having thermally insulating properties, i.e., very little conductive heat transfer. The resulting lower response frequency may be inadequate for a particular flow phenomena. Accordingly, a second mode of operation is provided which establishes an appropriate temperature difference between the upper and lower sensors to result in the desired upper sensor frequency response.

In this second mode, the lower active thermal isolation sensor 14 locally heats the model 28 to establish a fixed boundary temperature for the upper flow detection sensor 12. This fixed boundary temperature controls the amount of heat that is thermally conducted from the upper sensor 12 to the lower sensor 14. Since the lower sensor 14 is creating a fixed boundary temperature between the upper sensor 12 and the model, the amount of heat transfer from the upper sensor 12 to the lower sensor 14 can be calculated and subtracted from the total heat supplied by the upper flow detection sensor 12. The resulting difference is the heat loss from the upper sensor into the air flow via convection. As stated before, the voltage representing this convection loss is the quantity used to compute local, dynamic shear stress, skin friction and flow transition. All the necessary calculations and control can be implemented by the first and second devices 22 and 30 equipped with or connected to an appropriate microprocessor. This mode thus determines the quantity $\Delta T$ without the need for additional thermocouples while thermally isolating the upper sensor 12.

In most applications, the fixed boundary temperatures established by the lower sensor 14 is less than or equal to the temperature established by the upper sensor 12 for studying of the air flow. In the case of a highly thermally conductive test material, e.g., an aerodynamic body operated at cooler, high altitude conditions, this fixed boundary temperature can also be slightly greater, e.g., up to approximately 5% greater, than the temperature of the upper sensor.

The described sensor configuration and modes of operation effectively compensate for thermal losses to the model and thereby reduce power requirements of the upper flow detection sensor 12. The resulting height of the present configuration is still less than that of a conventional single sensor configuration having a polyimide layer which is thick enough to effectively thermally isolate the metal layer deposited thereon. In the present invention, any polyimide layer need only have sufficient thickness to ensure adequate electrical insulation to avoid shorting between the two metal layers with no regard for the additional thickness necessary to achieve thermal insulation. The thickness depicted is 0.001 inch or approximately 0.02 millimeters. Current fabrication techniques at NASA Langley Research Center, Hampton, Va. have reduced the polyimide layer to approximately 0.0005" while still providing the necessary electrical insulation. Further reductions in thickness may be possible while maintaining the necessary electrical insulation without departing from the teachings of the present invention.

Figure 2:
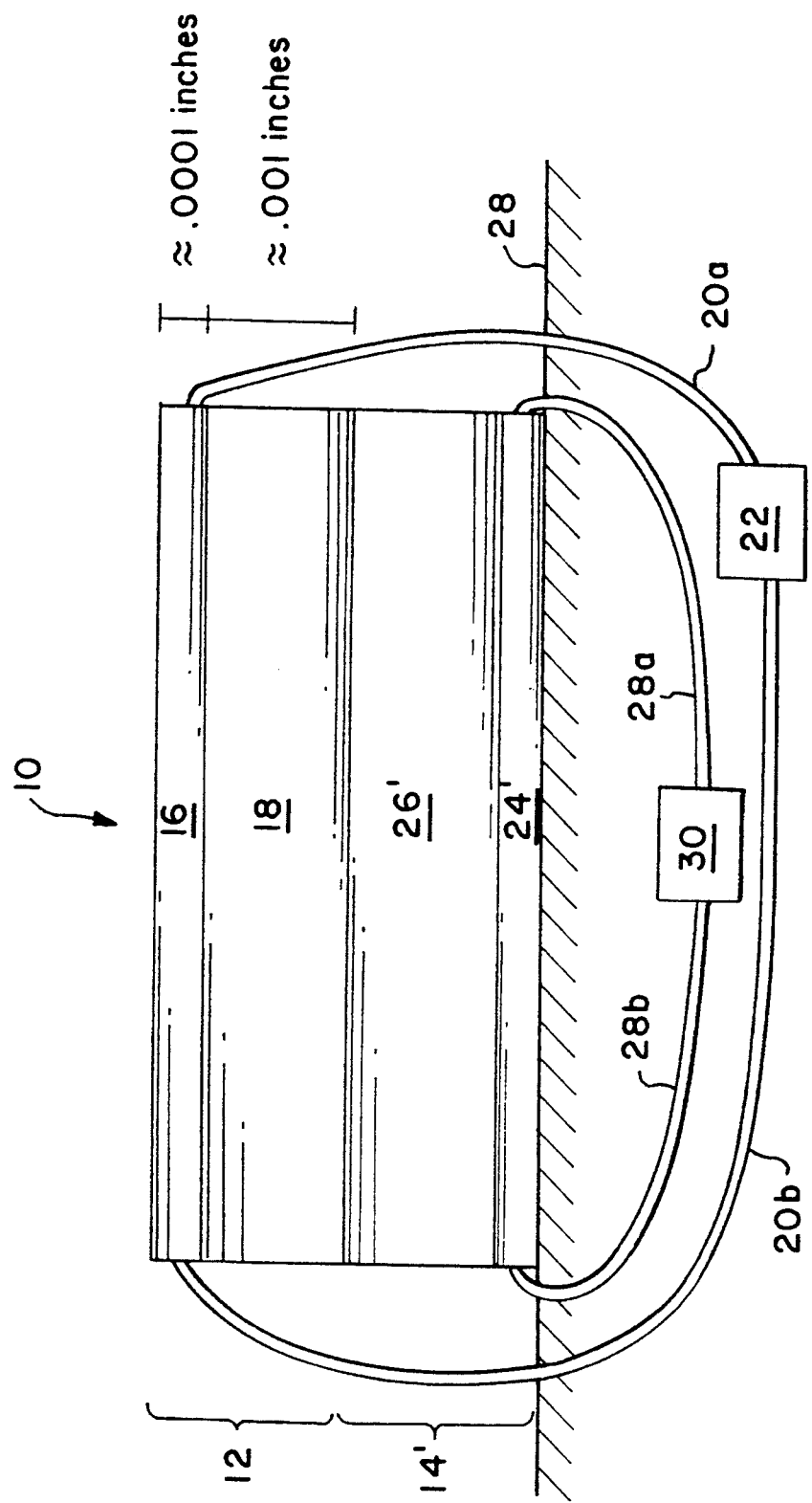
FIG. 2 is a side view of a second embodiment of the present invention comprising an upper hot-film sensor and lower active thermal isolator, wherein the isolator is oppositely oriented to the isolator shown in FIG. 1.

Referring now to FIG. 2, another embodiment of the present invention is shown which is identical to that shown in FIG. 1 except for thermal isolator 14'. Thermal isolator 14' is disposed such that its metal layer 24' is contacting the model surface 28 and its electrical resistance layer 26' is facing the electrical resistance layer 18 of hot film sensor 12. In other words, FIG. 2 shows a back-to-back arrangement of the isolator and sensor whereas FIG. 1 shows a back-to-face arrangement, wherein "back" refers to the electrical resistance layer and "face" refers to the metal layer. As before, the adjoining surfaces of the sensor and the isolator (resistive layers 18 and 26', respectively) are joined by an appropriate adhesive laminate, This embodiment is operated in the same two modes as discussed previously with respect to FIG. 1.

Work done by one of the named applicants indicates that this embodiment does not work well when operated to determine shear stress in the first mode wherein the sensor and isolator are operated at an identical set point temperature. The tests were conducted at a relatively low effective frequency of approximately 1 Hz. The present invention works best at flow frequencies exceeding 1 KHz. The test results are discussed in "Rise-Time Response of Nickel-Foil-on Kapton-Substrate, Hot-Film Shear Stress Sensors", D. C. Reda, AIAA-91-0169, 29th Aerospace Sciences Meeting, Jan. 7-10, 1991.

Figure 3:
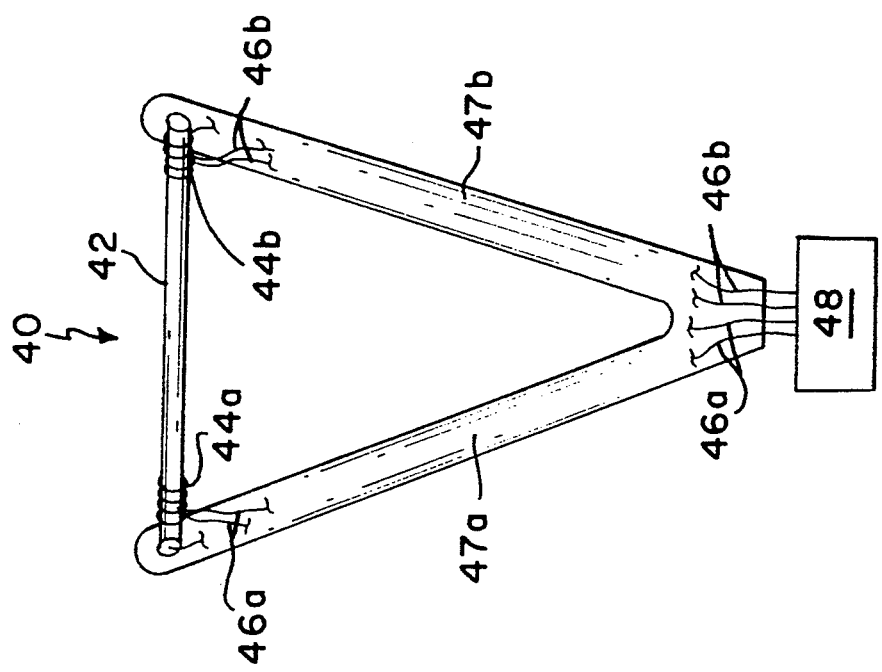
FIG. 3 is a side view of a third embodiment of the present invention for use with a hot wire anemometer.

The active thermal isolation of the present invention is not limited to polyimide films/metal layers configurations. For example, a hot wire anemometer 40 is shown in FIG. 3 and comprises a sensing wire 42 soldered to and extending between two branching supports 47a and 47b. Sensing wire 42 is electrically connected to a constant temperature anemometer circuit, whereby a change in the voltage supplied to the wire 42 to maintain a constant temperature is indicative of flow characteristics, as described above. Thermal insulation wires 44a and 44b are respectively spiralled around opposite ends of the sensing wire 42 and connected via respective lead wire pairs 46a and 46b to a controllable resistance developing circuit 48.

The anemometer 40 is conventionally affixed to the model such that the sensing wire 42 is located slightly above the model surface and accordingly conduction to the branching supports 47a and 47b occurs, increasing the power necessary to maintain the specified temperature of the hot wire anemometer. To avoid this problem, wires 44a and 44b are heated and controlled as described previously with respect to the lower sensor 14. Thus, the spiralled wires control conduction from the wire 42 to the supports 47a and 47b, and not conduction to the model as in the previous embodiments. The thermal isolation of this embodiment is not as effective because it does not separate the wire 42 from the supports 47a, 47b. A hot wire is not usually used to measure skin friction or shear stress because it is not in direct contact with the surface of the model like a film.

Figure 4:
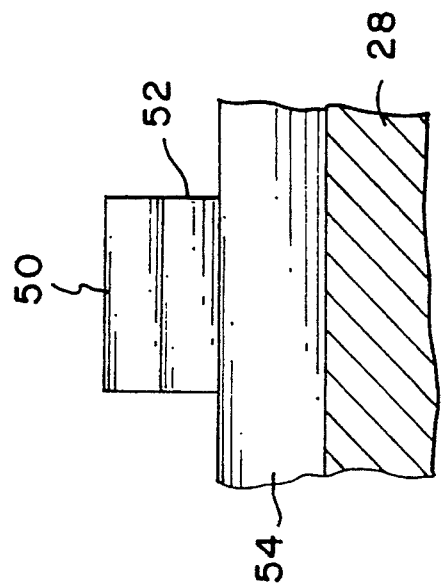
FIG. 4 is a side view of a fourth embodiment of the present invention for use with a semiconductor sensor.

Referring now to FIG. 4, an embodiment is shown wherein a so-called "smart" semiconductor sensor 50 is employed. Such a smart sensor is described in detail in "The Use of Silicon Microsensors in Smart Skins for Aerodynamic Research" by Debra A. Carraway, presented at the 14th International Conference on Instrumentation in Aerospace Facilities, Oct. 27-31, 1991. In a conventional configuration, the sensor 50 is affixed to a silicon layer having an appropriately etched constant temperature circuit, which in turn is affixed to the model. In this conventional configuration the semiconductor sensor 50 would heat the model surface via the silicon layer, creating a power demand to maintain the constant temperature. As shown in FIG. 4, an active thermal isolation semiconductor 52 is placed between upper semiconductor sensor 50 and etched silicon layer 54. Lower sensor 52 is operated in the same two modes as discussed previously to thermally isolate the upper sensor 50. As before, the total thickness of the upper sensor 50, lower sensor 52 and silicon layer 54 sandwich is less than any thermal insulation necessary to thermally isolate a conventional smart sensor configuration from the model.

The present invention offers several advantages over the prior art. Utilizing the first mode of operation, the conductive heat transfer to the model from the lower sensor or wires can be controlled with the same response time, and therefore the same temperature, as the upper hot film sensor or sensing wire in contact with the air flow. Utilizing the second mode, a fixed boundary temperature is established for the upper sensor or hot wire to thermally isolate the upper sensor or hot wire. This allows the response time of the upper sensor or hot wire, which is significantly better than the response time of an internally heated model, to be employed. Both modes have resulted in significant reductions in the power requirements necessary to maintain a given temperature of the upper sensor. Since heating requirements for conduction are reduced, the upper sensor and hot-wire can be operated at higher temperatures in convective contact with the air flow within the operating limits of the particular system employed. These higher operating temperatures correspond directly with the ability to detect higher frequencies of boundary layer turbulence. In addition, the thermal isolation of the upper sensor and hot-wire results in the electronic frequency response to a square wave input used in typical anemometer bridge tuning techniques being independent of any model thermal properties.

The foregoing results are achieved without any modification of the model interior or invasive degradation of the model surface. The proposed stack arrangement of sensors can be bonded to most aerodynamic body surfaces including curved surfaces as known in the art and can be removed after completion of the experiment.

Many improvements, modifications and substitutions will be apparent to the skilled artisan without departing from the spirit and scope of the present invention as described in the present specification and defined in the following claims.

What is claimed is:

1. An apparatus for monitoring airflow over a specified surface of a body comprising:
   a temperature responsive sensor located in the airflow over the specified surface of the body;
   means for maintaining said temperature responsive sensor at a constant temperature;
   an active thermal isolator located between said temperature responsive sensor and the specified surface of the body, wherein said active thermal isolator comprises an upper layer facing said temperature responsive sensor and having a relatively high temperature coefficient of resistance and a lower layer having a relatively high electrical resistance; and
   means for controlling the temperature of said active thermal isolator to reduce conductive heat flow from said temperature responsive sensor to the body, wherein said temperature controlling means controls the temperature of the upper layer of said active thermal isolator.

2. The airflow monitoring apparatus according to claim 1, wherein the upper layer of said active thermal isolator comprises a metal.

3. The airflow monitoring apparatus according to claim 1, wherein the lower layer of said active thermal isolator comprises a polyimide.

4. The airflow monitoring apparatus according to claim 1, wherein said temperature responsive sensor comprises an upper layer facing the airflow and having a relatively high temperature coefficient of resistance and a lower layer located between this upper layer and the upper layer of said active thermal isolator and having a relatively high electrical resistance, wherein said constant temperature maintaining means maintains the temperature of the upper layer of said temperature responsive sensor.

5. The airflow monitoring apparatus according to claim 1, wherein the fixed boundary temperature of said active thermal isolator is equal to the maintained constant temperature of said temperature responsive sensor.

6. The airflow monitoring apparatus according to claim 1, wherein the fixed boundary temperature of said active thermal isolator is less than the maintained constant temperature of said temperature responsive sensor.

7. The airflow monitoring apparatus according to claim 1, wherein the fixed boundary temperature of said active thermal isolator is greater than the maintained constant temperature of said temperature responsive sensor.

8. An apparatus for monitoring airflow over a specified surface of a body comprising:
a temperature responsive sensor located in the airflow over the specified surface of the body;.
means for maintaining said temperature responsive sensor at a constant temperature;
an active thermal isolator located between said temperature responsive sensor and the specified surface of the body, wherein said active thermal isolator comprises an upper layer facing said temperature responsive sensor and having a relatively high electrical resistance and a lower layer having a relatively high temperature coefficient of resistance; and
means for controlling the temperature of said active thermal isolator to reduce conductive heat flow from said temperature responsive sensor to the body wherein said temperature controlling means controls the temperature of the lower layer of said active thermal isolator.

9. The airfoil monitoring apparatus according to claim 8, wherein the upper layer of said active thermal isolator comprising a polyimide.

10. The airfoil monitoring apparatus according to claim 8, wherein the lower layer of said active thermal isolator comprises a metal.

11. The airflow monitoring apparatus according to claim 8, wherein said temperature responsive sensor comprises an upper layer facing the airflow and having a relatively high temperature coefficient of resistance and a lower layer located between this upper layer and the upper layer of said active thermal isolator and having a relatively high electrical resistance, wherein said constant temperature maintaining means maintains the temperature of the upper layer of said temperature responsive sensor.

12. The airflow monitoring apparatus according to claim 8, wherein the fixed boundary temperature of said active thermal isolator is equal to the maintained constant temperature of said temperature responsive sensor.

13. The airflow monitoring apparatus according to claim 8, wherein the fixed boundary temperature of said active thermal isolator is less than the maintained constant temperature of said temperature responsive sensor.

14. The airflow monitoring apparatus according to claim 8, wherein the fixed boundary temperature of said active thermal isolator is greater than the maintained constant temperature of said temperature responsive sensor.

15. An apparatus for monitoring airflow over a specified surface of a body comprising:
a temperature responsive sensor located in the airflow over the specified surface of the body, wherein said temperature responsive sensor is a hot wire anemometer comprising a sensing wire connected end-to-end between a support structure and an active thermal isolator comprising first and second wires in communication with said temperature controlling means, the first wire being wrapped around one end of the sensing wire and the second wire being wrapped around an opposite end of the sensing wire;
means for maintaining said temperature responsive sensor at a constant temperature;
said active thermal isolator located between said temperature responsive sensor and the specified surface of the body; and
means for controlling the temperature of said active thermal isolator to reduce conductive heat flow from said temperature responsive sensor to the body.

16. The airflow monitoring apparatus according to claim 15, wherein said temperature controlling means controls the temperature of the first and second wires such that the temperature of the first and second wires is approximately equal to that of the sensing wire.

17. The airflow monitoring apparatus according to claim 15, wherein said temperature controlling means maintains a fixed boundary temperature of the first and second wires between the body and the sensing wire.

18. The airflow monitoring apparatus according to claim 17, wherein the fixed boundary temperature of the first and second wires is less than or equal to the maintained constant temperature of the sensing wire.

19. The airflow monitoring apparatus according to claim 17, wherein the fixed boundary temperature of the first and second wires, is slightly greater than the maintained temperature of the sensing wire.

20. The airflow monitoring apparatus according to claim 15, wherein the fixed boundary temperature of said active thermal isolator is equal to the maintained constant temperature of said temperature responsive sensor.

21. The airflow monitoring apparatus according to claim 15, wherein the fixed boundary temperature of said active thermal isolator is less than the maintained constant temperature of said temperature responsive sensor.

22. The airflow monitoring apparatus according to claim 15, wherein the fixed boundary temperature of said active thermal isolator is greater than the maintained constant temperature of said temperature responsive sensor.

23. An apparatus for thermally isolating a temperature responsive sensor having a maintained constant temperature for monitoring airflow over a specific area of a body, the apparatus comprising:
an active thermal isolator located between the temperature responsive sensor and the specific area of the body, wherein said active thermal isolator comprises an upper layer facing the temperature responsive sensor and having a relatively high temperature coefficient of resistance and a lower layer having a relatively high electrical resistance located between the upper layer and the body; and means for controlling the temperature of said active thermal isolator to reduce conductive heat flow from the temperature responsive sensor to the body wherein said temperature controlling means controls the temperature of the upper layer of said active thermal isolator.

24. The airflow monitoring apparatus according to claim 23, wherein the fixed boundary temperature of said active thermal isolator is equal to the maintained constant temperature of said temperature responsive sensor.

25. The airflow monitoring apparatus according to claim 23, wherein the fixed boundary temperature of said active thermal isolator is less than the maintained constant temperature of said temperature responsive sensor.

26. The airflow monitoring apparatus according to claim 23, wherein the fixed boundary temperature of said active thermal isolator is greater than the maintained constant temperature of said temperature responsive sensor.

* * * * *